US012739797B2

(12) United States Patent
Yang et al.

(10) Patent No.: US 12,739,797 B2
(45) Date of Patent: Sep. 15, 2026

(54) METHOD AND NETWORK NODE FOR CONTROLLING TRANSMISSION PARAMETERS OF UPLINK CONFIGURED GRANT TRANSMISSIONS

(71) Applicant: Telefonaktiebolaget LM Ericsson (publ), Stockholm (SE)

(72) Inventors: Yanpeng Yang, Järfälla (SE); Ying Sun, Täby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 259 days.

(21) Appl. No.: 18/834,605

(22) PCT Filed: Feb. 3, 2022

(86) PCT No.: PCT/SE2022/050119

§ 371 (c)(1), (2) Date: Jul. 30, 2024

(87) PCT Pub. No.: WO2023/149824

PCT Pub. Date: Aug. 10, 2023

(65) Prior Publication Data

US 2025/0142539 A1 May 1, 2025

(51) Int. Cl.
*H04W 72/04* (2023.01)

(52) U.S. Cl.
CPC .................................... *H04W 72/04* (2013.01)

(58) Field of Classification Search
CPC ..... H04W 72/04; H04W 52/08; H04W 52/10; H04W 52/242; H04W 52/325;
(Continued)

(56) References Cited

U.S. PATENT DOCUMENTS

| | | | |
|---|---|---|---|
| 8,654,894 | B2 | 2/2014 | Andrews et al. |
| 2004/0106425 | A1 | 6/2004 | Koo et al. |

(Continued)

FOREIGN PATENT DOCUMENTS

| | | | | |
|---|---|---|---|---|
| EP | 1273107 B1 * | 8/2005 | ............ H04W 52/12 |
| EP | 3 557 808 A1 | 10/2019 | |

(Continued)

OTHER PUBLICATIONS

Non-Final Office Action issued in U.S. Appl. No. 18/568,763 dated Jan. 27, 2026 (13 pages).

(Continued)

*Primary Examiner* — Wutchung Chu
(74) *Attorney, Agent, or Firm* — Rothwell, Figg, Ernst & Manbeck, P.C.

(57) ABSTRACT

Disclosed is a method and a network node (130) of a wireless communication network (100) for controlling transmission parameters of uplink, UL, configured grant, CG, transmissions sent by a User Equipment, UE (140). The method comprises determining a respective transmission quality value for CG transmissions received from the UE (140) over time, the CG transmissions being sent with a power based on a power control, PC, target and a link adaptation, LA, target. When a distribution value of the transmission quality values is higher than a transmission quality target, a transmission benefit of increasing the LA target with a certain value is estimated. When the transmission benefit is higher than a threshold, the LA target is increased with the certain value, a new allocation of CG transmission resources is triggered based on the increased LA target, and information on the new allocation of CG transmission resources are sent to the UE (140).

15 Claims, 7 Drawing Sheets

(58) Field of Classification Search
CPC . H04W 52/367; H04W 72/115; H04L 1/0003; H04L 1/0009; H04L 1/0015
See application file for complete search history.

(56) References Cited

U.S. PATENT DOCUMENTS

| | | | | |
|---|---|---|---|---|
| 2004/0184417 | A1 | 9/2004 | Chen et al. | |
| 2006/0293075 | A1 | 12/2006 | Kansakoski et al. | |
| 2008/0165805 | A1 | 7/2008 | Terry | |
| 2012/0106386 | A1 | 5/2012 | Johansson et al. | |
| 2013/0130737 | A1* | 5/2013 | Kobayashi | H04W 52/242 455/522 |
| 2013/0229906 | A1 | 9/2013 | Akkarakaran et al. | |
| 2013/0258926 | A1 | 10/2013 | Osakada | |
| 2014/0080529 | A1 | 3/2014 | Mohan et al. | |
| 2014/0185591 | A1 | 7/2014 | Chizgi et al. | |
| 2015/0141027 | A1 | 5/2015 | Tsui et al. | |
| 2015/0271816 | A1 | 9/2015 | Akkarakaran et al. | |
| 2016/0353374 | A1 | 12/2016 | Höglund et al. | |
| 2017/0141903 | A1 | 5/2017 | Xu | |
| 2018/0054246 | A1 | 2/2018 | Kong | |
| 2018/0324708 | A1 | 11/2018 | Cheng | |
| 2019/0028233 | A1 | 1/2019 | Bontu et al. | |
| 2019/0200363 | A1* | 6/2019 | Rajendran | H04W 52/325 |
| 2019/0208510 | A1 | 7/2019 | Park | |
| 2019/0268793 | A1* | 8/2019 | Golitschek Edler von Elbwart | H04W 24/10 |
| 2019/0288804 | A1 | 9/2019 | Jiang et al. | |
| 2020/0037317 | A1 | 1/2020 | Guo et al. | |
| 2020/0068501 | A1 | 2/2020 | Wang et al. | |
| 2020/0068502 | A1 | 2/2020 | Mao et al. | |
| 2020/0220693 | A1 | 7/2020 | Babaei et al. | |
| 2020/0252882 | A1 | 8/2020 | Charipadi | |
| 2020/0260486 | A1 | 8/2020 | Zhou et al. | |
| 2020/0275413 | A1 | 8/2020 | Zhang et al. | |
| 2020/0367268 | A1 | 11/2020 | Tijoriwala et al. | |
| 2020/0383061 | A1* | 12/2020 | Yang | H04W 52/50 |
| 2020/0404632 | A1 | 12/2020 | Zhou et al. | |
| 2023/0045267 | A1 | 2/2023 | Kumagai et al. | |
| 2023/0093810 | A1* | 3/2023 | Takizawa | H04L 5/006 370/329 |
| 2024/0284342 | A1 | 8/2024 | Yoo | |

FOREIGN PATENT DOCUMENTS

| | | | | |
|---|---|---|---|---|
| EP | 3 606 187 | A1 | 2/2020 | |
| KR | 20220093265 | A * | 7/2022 | H04W 72/23 |
| WO | 2019/144898 | A1 | 8/2019 | |
| WO | 2019/155249 | A1 | 8/2019 | |
| WO | 2021/025693 | A1 | 2/2021 | |
| WO | 2021/149163 | A1 | 7/2021 | |
| WO | 2022/245261 | A1 | 11/2022 | |
| WO | 2022/260565 | A1 | 12/2022 | |

OTHER PUBLICATIONS

Vivo, "Outcome of offline discussion on Configured grant enhancement", 3GPP TSG RAN WG1#96bis, R1-1905792, Xi'an, China, Apr. 8-12, 2019 (27 pages).
3GPP TS 38.214 V16.5.0 (Mar. 2021) (171 pages).
3GPP TS 38.331 V16.4.1 (Mar. 2021) (949 pages).
3GPP TS 38.213 V16.5.0 (Mar. 2021) (184 pages).
ZTE, "UL inter-UE multiplexing between eMBB and URLLC", 3GPP TSG RAN WG1 #97, R1-1906413, Reno, USA, May 13-17, 2019 (13 pages).
Vivo, "Summary#2 of UL inter UE Tx prioritization/multiplexing" 3GPP TSG RAN WG1 Meeting #97, R1-1907819, Reno, USA, May 13-17, 2019 (35 pages).
Ericsson, "Inter-UE Prioritization and Muliplexing of UL Transmissions", 3GPP TSG-RAN WG1 Meeting #98bis, R1-1910549, Chongqing, China, Oct. 14-20, 2019 (12 pages).
International Search Report and Written Opinion issued in International Application No. PCT/SE2022/050119 dated Oct. 17, 2022 (11 pages).
Lee, H. et al., "Physical Layer Enhancements For Ultra-Reliable Low-Latency Communications In 5G New Radio Systems", Wireless and Radio Communications, IEEE Communications Standards Magazine, Dec. 2021 (11 pages).
Mohan, K. et al., "Link Adaptation Schemes Based on Parametric Estimation of SNR Distribution Over Nakagami-m Fading Channels", IEEE Transactions on Communications, vol. 67, No. 2, Feb. 2019 (17 pages).
Jacobsen, T. et al., Joint Resource Configuration and MCS Selection Scheme for Uplink Grant-Free URLLC, IEEE, 2018 (6 pages).
Le T. et al., "Enhancing URLLC Uplink Configured-grant Transmissions", IEEE, 2021 (5 pages).
International Search Report and Written Opinion issued in International Application No. PCT/SE2021/050570 dated Feb. 21, 2022 (6 pages).
Paris, S., et al., "Rate adaptation algorithms for reliable multicast transmissions in wireless LANs," Chapter 3 in Modeling and Simulation of Computer Networks and Systems, Elsevier Inc. 2015 (40 pages).
Kim, W. et al., "Power headroom report-based uplink power control in 3GPP LTE-A HetNet", EURASIP Journal on Wireless Communications and Networking (2015) 2015:233 (13 pages).
Lagen, S. et al., "New Radio Physical Layer Abstraction for System-Level Simulations of 5G Networks", IEEE, 2020 (7 pages).
Mandelli, S. et al., "Power Optimization for Low Interference and Throughput Enhancement 5G and 6G systems", IEEE, 2021 (7 pages).
International Preliminary Report on Patentability issued in International Application No. PCT/SE2021/050570 dated Jul. 6, 2023 (13 pages).
Notice of Allowance issued in U.S. Appl. No. 18/568,763 dated Jun. 2, 2026 (10 pages).

* cited by examiner

METHOD AND NETWORK NODE FOR CONTROLLING TRANSMISSION PARAMETERS OF UPLINK CONFIGURED GRANT TRANSMISSIONS

CROSS REFERENCE TO RELATED APPLICATIONS

This application is a 35 U.S.C. § 371 National Stage of International Patent Application No. PCT/SE2022/050119, filed 2022 Feb. 3.

TECHNICAL FIELD

The disclosure relates generally to a method and a network node for controlling transmission parameters of uplink configured grant transmissions in a wireless communication network. The disclosure further relates to a computer program and a carrier corresponding to the method and network node.

BACKGROUND

In the ever-increasing demand on wireless communication services, it has been observed that wireless communication devices, aka wireless devices, aka User Equipment (UE) have different needs when it comes to different characteristics, such as latency, data rates, reliability, etc. For this reason, the $5^{th}$ Generation (5G) wireless communication technology such as New Radio (NR) has introduced different service categories, or uses case, adapted for different groups of wireless devices with different needs. Examples of such service categories are: Ultra reliable and low latency communications (URLLC) that cater to provide multiple advanced services for low latency-sensitive connected devices, such as factory automation, autonomous driving, the industrial Internet and smart grid or robotic surgeries; Enhanced Mobile Broadband (eMBB) that will supply high bandwidth internet access for wireless connectivity, large-scale video streaming, and virtual reality; and Massive Machine Type Communication (MMTC) that supports Internet access for sensing, metering, and monitoring devices.

One of the key features for the URLLC services are the strict delay requirements. In order to support those delay requirements for URLLC services in the uplink (UL), semi-persistent scheduling for the UL is introduced in the NR Rel-15 standard. This type of transmission is carried out without resource request, i.e. without a scheduling request (SR) sent by the UE towards the network node for requests an access channel that is received as a scheduling grant (SG), such as in the Random Access Channel (RACH) procedure. Instead, the UE is informed beforehand by the network node, which communication resources it has been allocated where it can transmit data. Such a procedure is called Configured Grant (CG). This scheduling mechanism enables for example a user with a periodic traffic to transmit its data readily, and hereby provides low latency access. To facilitate ultra-reliable communication, the scheduling mechanism can allow the user to transmit redundant transmissions at consecutive repetition occasions in a pre-defined period. The main advantage of CG as compared to SR-based dynamic grant is the time saved for resource allocation signaling. Moreover, strict reliability requirements on the control channel can also be optimized by pre-configuring radio resources.

There are two variants of UL CG, namely CG Type 1 and CG Type 2. For CG Type 1 the CG is fully Radio Resource Control (RRC) configured without any Layer 1 (L1) signaling while CG Type 2 is partly RRC configured and partly dynamically indicated. The RRC information element for configuration of CG looks as described in 3GPP TS 38.331, V16.4.1, Section 6.3.2. As shown here, the information element (IE) configuredGrantConfig is common to both the CG Type 1 and CG Type 2, whereas the information in rrc-ConfiguredUplinkGrant is Type1-specific and is not provided in Type 2. ConfiguredUplinkGrant and mcsAndTBS, which is part of an IE specified via RRC signaling about the configuredUplinkGrant, specify the modulation order, target code rate and transport block (TB) size, see 3GPP TS 38.214, V16.5.0, Section 6.1.2. The quantity timeDomainAllocation specifies the time domain resource allocation and frequencyDomainAllocation specifies the frequency domain resource allocation for UL CG Type 1. To summarize, for CG Type 1, the TB size and radio resource allocation is determined at RRC configuration. For UL CG Type 2 corresponding information, such as Modulation and Coding Scheme (MCS), Transport Block Size (TBS), frequencyDomainAllocation and timeDomainAllocation is provided by the CG activation Downlink control information (DCI). The activation DCI for CG is scrambled with Configured Scheduling—Radio Network Temporary Identifier (CS-RNTI). When an uplink CG Type 2 configuration is activated, the TB size, MCS, frequency and time domain allocation signaled via DCI activation will be used until a new (re) activation DCI with updated resource allocation is received. According to above standards, the UE shall not transmit anything on the resources configured by ConfiguredGrantConfig if the higher layers did not deliver a TB to transmit on the resources allocated for uplink transmission without grant. For both types of UL CG, and when powerControlLoopToUse is active, closed loop power control is applied for UL CG transmission.

In the following, power control as performed according to the 3GPP NR standard described in 3GPP TS 38.213, V16.5.0, section 7.1 is described. The UE transmit power control scheme can be simplified according to the following equation:

$$P_{UL} = \min(P_{max}, P_0 + 10\log(2^{\mu} \cdot M) + \alpha \cdot PL + \Delta_{TF} + f) \tag{1}$$

In (1), $P_{UL}$ is the UE transmit power, $P_{max}$ is the maximum UE transmit power with restrictions. The UE transmit power is also limited to a maximum of −7 dBW in the vast majority of cases. Further in (1), $P_0$ is the power spectrum density target per physical resource block (PRB) and it is signaled to the UE, μ is the numerology, M is the number of PRBs that is used by the uplink transmission, and α is the fractional pathloss power control fraction. When α is equal to 1, the full pathloss is compensated, when α is smaller than 1, the pathloss is partly compensated for by the UE transmit power. The objective is to reduce the potential generated inter-cell interference. Further in (1), PL is the estimated pathloss of the UE, $\Delta_{TF}$ is a factor depending on the selected transport format, and $f$ is the closed loop transmit power control (TPC) command that is signaled from the gNodeB (gNB) to the UE. According to the standards, the TPC command default step sizes are −1 dB, 0 dB, +1 dB and +3 dB. The standard allows the gNB to perform fast closed loop power control based on the estimated signal quality, where it decides to raise or lower the UE transmit power.

DCI format 2_2 is used for the transmission of TPC commands for a group of UEs which are configured with a semi-persistent scheduling scheme. DCI format 2_2 with Cyclic Redundancy Check (CRC) is scrambled by TPC-PUSCH-RNTI containing information about TPC commands for each UE and is sent on the physical downlink control channel (PDCCH) common search space. PUSCH stands for Physical Uplink Shared Channel.

There are generally two types of UL power control: open loop and closed loop. For closed loop power control, the network node measures signal quality such as signal to interference and noise ratio (SINR) of received signals and decides to raise or lower the UE transmit power according to a certain transmit power control (TPC) command based on measured signal quality and the P0, during the ongoing UL transmission. According to the 3GPP TS 38.213 V16.5.0 Chapter 7, TPC commands are set to step sizes of −1 dB, 0 dB, +1 dB and +3 dB, i.e. the network node selects any of the TPC commands mentioned as $f$ in formula (1) above.

For open loop power control, after initial setup, when configuring e.g. uplink configured grant, there is no such feedback including TPC commands during the UL transmission as for closed loop power control. In other words, the correction factor $f$ is not used in formula (1) above. The transmit open loop power of UL signals can be expressed as $$P_{,tx} = \max(P_{max}, P_0 + 10\log(2^{\mu} \cdot M) + \alpha \cdot PL + \Delta_{TF})[dBm] \quad (2)$$

In existing open loop and closed loop power control, all UEs in a cell receives the same power target P0 from the network node, the target being a fixed value. Still further, the initial link adaptation to select UL resource allocation is based on a current SINR, which can be obtained via below equation.

$$\text{SIN}R = P_{rx} - I_{est}$$

where $I_{est}$ is the current interference estimation, which is a filtered interference level that is measured by the network node on a cell level, that is $I_{est}$ is the same for all UEs in the cell. $P_{rx}$ is the estimated received power per PRB, and it can be obtained from the below equation $$P_{rx} = \min(P_0, P_{max} - 10\log(2^{\mu} \cdot M) - \alpha \cdot PL - \Delta_{TF})$$

Based on the current SINR, the network node performs link adaptation (LA) to select modulation and coding scheme (MCS), Transport Block Size (TBS) and number of Physical Resource Blocks (PRBs) to transmit the required data size with a required reliability requirement.

For CG transmission, there is an aim to adapt transmit power of the CG transmissions to changes in transmission quality. There is another aim to adapt the number of transmission resources allocated for a CG transmission to changes in transmission quality. There is yet another aim to adapt Modulation and Coding Scheme (MCS) used for the CG transmissions to changes in transmission quality. Purposes of the above aims are: to achieve an efficient usage of existing transmission resources; to mitigate any interference to other cells; to extend battery life time of UEs; to provide reliable CG communication.

SUMMARY

It is an object of the invention to enable improved handling of configured grant transmissions.

According to one aspect, a method is provided that is performed by a network node of a wireless communication network and that is for controlling transmission parameters of UL CG transmissions sent by a UE and received by the network node. The method comprises receiving, from the UE, CG transmissions over time on first allocated CG transmission resources, the CG transmissions transmitted by the UE with a power that is related to a power control (PC) target value and a link adaptation (LA) target value. The method further comprises determining a respective transmission quality value for the CG transmissions received over time. When a distribution value of the determined transmission quality values received over time is higher than a transmission quality target value, the method further comprises estimating a transmission benefit of increasing the LA target value with a certain value and determining whether the estimated transmission benefit is higher than a transmission benefit threshold. When the estimated transmission benefit is higher than the transmission benefit threshold, the LA target value is increased with the certain value, a new allocation of CG transmission resources is triggered based on the increased LA target value, and information on the new allocation of CG transmission resources are sent to the UE. When the estimated transmission benefit is lower than the transmission benefit threshold, the PC target value is decreased with a first PC value while maintaining the LA target value, and information on a value related to the first PC value are sent to the UE.

According to another aspect, a network node is provided that is configured to operate in a wireless communication network and that is configured for controlling transmission parameters of UL CG transmissions sent by a UE. The network node comprises a processing circuitry and a memory. Said memory contains instructions executable by said processing circuitry, whereby the network node is operative for receiving, from the UE, CG transmissions over time on first allocated CG transmission resources, the CG transmissions transmitted by the UE with a power that is related to a PC target value and a LA target value and determining a respective transmission quality value for the CG transmissions received over time. Further, when a distribution value of the determined transmission quality values received over time is higher than a transmission quality target value, the network node is operative for estimating a transmission benefit of increasing the LA target value with a certain value and determining whether the estimated transmission benefit is higher than a transmission benefit threshold. Further, when the estimated transmission benefit is higher than the transmission benefit threshold, the network node is operative for increasing the LA target value with the certain value, triggering a new allocation of CG transmission resources based on the increased LA target value and sending to the UE, information on the new allocation of CG transmission resources, or when the estimated transmission benefit is lower than the transmission benefit threshold, the network node is operative for decreasing the PC target value with a first PC value while maintaining the LA target value, and sending to the UE, information on a value related to the first PC value.

According to other aspects, computer programs and carriers are also provided, the details of which will be described in the claims and the detailed description.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

Figure 1A:
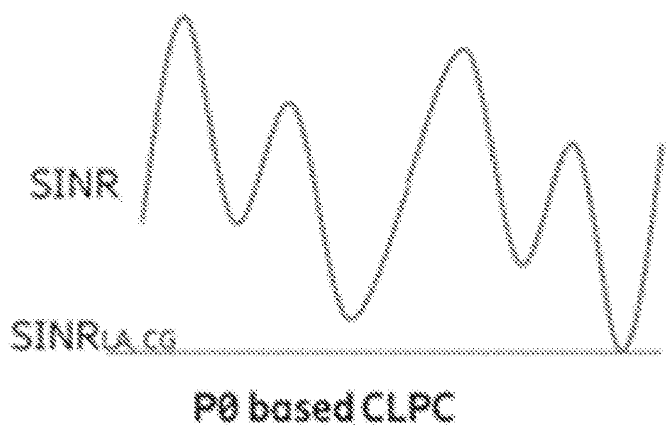
FIG. 1*a* is a diagram of SINR of a P0-based closed loop power control (CLPC) according to the prior art.
Figure 1B:
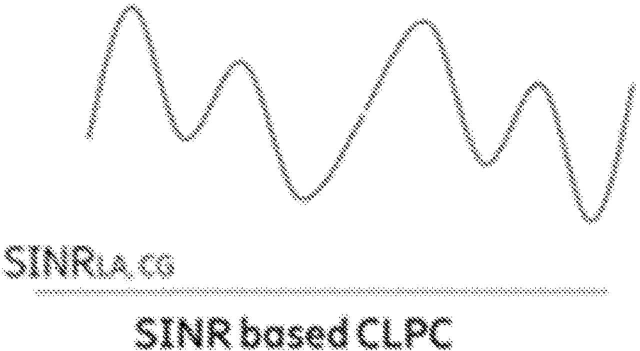
FIG. 1*b* is a diagram of SINR of a SINR-based closed loop power control (CLPC) according to pending patent application PCT/SE2021/050478.

In pending International patent application PCT/SE2021/050478 of the applicant, it is proposed to have a combined fast closed loop power control (PC) and link adaptation (LA) scheme, which is based on a predefined power control SINR target (PC_SINRtarget) and link adaptation SINR target (LA_SINRtarget). The proposed scheme therein can reduce SINR distribution by adjusting the UE transmit power, see FIGS. 1*a* and 1*b*. FIG. 1*a* shows SINR distribution for a UE communication when using a prior art P0-based CLPC, whereas FIG. 1*b* shows SINR distribution for the same UE when using the SINR-based closed loop method of the mentioned co-pending International patent application. By comparing the curves of the two figures, it is clear that the SINR-based closed loop method decreases the SINR variation. However, after fast closed loop power control, the initial UL CG allocation with the LA_SINRtarget, called SINRLA, CG in FIGS. 1*a* and 1*b*, might become too conservative, as shown by the distance between the SINRLA, CG in FIG. 1*b* and the actual SINR, which results in lower spectrum efficiency.

The inventors had the idea that with some kind of outer loop power control, it may be possible to adjust the LA_SINRtarget based on information on ACK/NACK information and select a more proper MCS and/or allocation of transmission resources, e.g., Physical Resource Blocks (PRB) for future transmissions. However, it is not possible to change the settings frequently in CG setup. Therefore, it is of interest to design an improved outer loop adjustment algorithm for CG transmissions.

According to an embodiment, a new outer loop PC and LA scheme for UL CG transmissions is provided. The scheme discloses a combined outer loop PC and LA scheme to adjust the PC_target and an LA target such as the LA_SINRtarget, and also describes the interaction between link adaptation, power control and scheduling. According to another embodiment, the scheme also proposes to define a transmission benefit threshold such as a link adaptation adjustment threshold, TH_LA_target. When the transmission quality is better than a transmission quality target, then the gain of changing the UL CG allocation is compared to the TH_LA_target, i.e., it is checked whether the spectrum efficiency gain of using a higher MCS is significant enough to change the UL CG configuration. If the gain is higher than the target, then LA_SINRtarget is increased, and the UL CG allocating is changed per UE so that the number of PRBs is decreased. If the gain is lower than the TH_LA_target, then the PC_target is decreased, for example by use of a new parameter, PCtargetStepSize_decrease, so that a more efficient UE transmit power is obtained. If the transmission quality is worse than the transmission quality target, then PC_target is increased, if the maximum value of PC_target has not already been reached. If the maximum has been reached, LA_SINRtarget is decreased, and the UL CG allocation is changed so that the number of PRBs is increased. One way of increasing LA_SINRtarget is to decrease a parameter called SINR_backoff, which is an offset that is subtracted from the measured SINR value to arrive at the LA_SINRtarget. It is worth noting that the invention is applicable to any network using an LA target and PC target for power control of CG transmissions, not just for improving the method described in the pending International patent application PCT/SE2021/050478.

Figure 2:
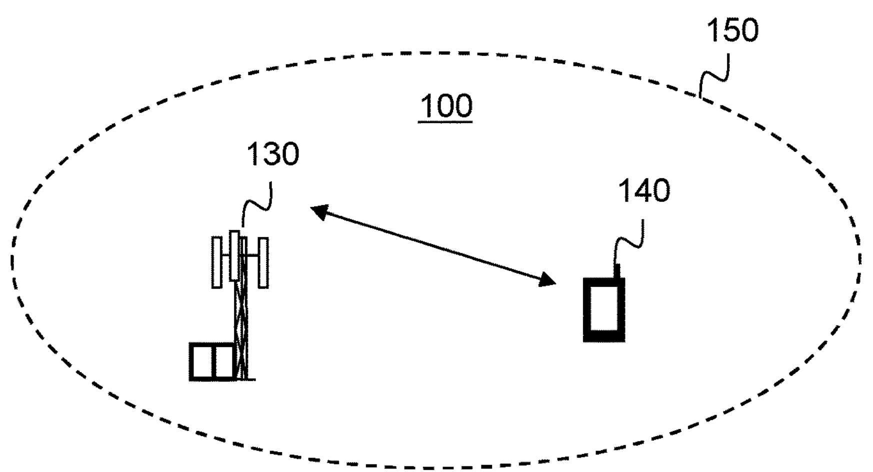
FIG. 2 is a schematic block diagram of a wireless communication network in which the present invention may be used.

FIG. 2 shows a wireless communication network 100 comprising a radio access network (RAN) node aka network node 130 that is in, or is adapted for, wireless communication with a wireless communication device aka UE 140. The network node 130 provides radio access in a cell 150.

The wireless communication network 100 may be any kind of wireless communication network that can provide radio access to wireless devices. Example of such wireless communication networks are networks based on Global System for Mobile communication (GSM), Enhanced Data Rates for GSM Evolution (EDGE), Universal Mobile Telecommunications System (UMTS), Code Division Multiple Access 2000 (CDMA 2000), Long Term Evolution (LTE), LTE Advanced, Wireless Local Area Networks (WLAN), Worldwide Interoperability for Microwave Access (WiMAX), WiMAX Advanced, as well as fifth generation (5G) wireless communication networks based on technology such as New Radio (NR), and any possible future sixth generation (6G) wireless communication network.

The network node 130 may be any kind of network node that can provide wireless access to a UE 140 alone or in combination with another network node. Examples of network nodes 130 are a base station (BS), a radio BS, a base transceiver station, a BS controller, a network controller, a Node B (NB), an evolved Node B (eNB), a gNodeB (gNB), a Multi-cell/multicast Coordination Entity, a relay node, an access point (AP), a radio AP, a remote radio unit (RRU), a remote radio head (RRH) and a multi-standard BS (MSR BS).

The UE 140 may be any type of device capable of wirelessly communicating with a network node 130 using radio signals. For example, the UE 140 may be a machine type UE or a UE capable of machine to machine (M2M) communication, an Internet of Things (IoT) device, a sensor, a tablet, a mobile terminal, a smart phone, a laptop embedded equipped (LEE), a laptop mounted equipment (LME), a USB dongle, a Customer Premises Equipment (CPE) etc.

An "IoT device" may be a device for use in one or more application domains, these domains comprising, but not limited to, home, city, wearable technology, extended reality, industrial application, and healthcare.

By way of example, the IoT device for a home, an office, a building or an infrastructure may be a baking scale, a coffee machine, a grill, a fridge, a refrigerator, a freezer, a microwave oven, an oven, a toaster, a water tap, a water heater, a water geyser, a sauna, a vacuum cleaner, a washer, a dryer, a dishwasher, a door, a window, a curtain, a blind, a furniture, a light bulb, a fan, an air-conditioner, a cooler, an air purifier, a humidifier, a speaker, a television, a laptop, a personal computer, a gaming console, a remote control, a vent, an iron, a steamer, a pressure cooker, a stove, an electric stove, a hair dryer, a hair styler, a mirror, a printer, a scanner, a photocopier, a projector, a hologram projector, a 3D printer, a drill, a hand-dryer, an alarm clock, a clock, a security camera, a smoke alarm, a fire alarm, a connected doorbell, an electronic door lock, a lawnmower, a thermostat, a plug, an irrigation control device, a flood sensor, a moisture sensor, a motion detector, a weather station, an electricity meter, a water meter, and a gas meter.

By further ways of example, the IoT device for use in a city, urban, or rural areas may be connected street lighting, a connected traffic light, a traffic camera, a connected road sign, an air control/monitor, a noise level detector, a transport congestion monitoring device, a transport controlling device, an automated toll payment device, a parking payment device, a sensor for monitoring parking usage, a traffic management device, a digital kiosk, a bin, an air quality monitoring sensor, a bridge condition monitoring sensor, a fire hydrant, a manhole sensor, a tarmac sensor, a water fountain sensor, a connected closed circuit television, a scooter, a hoverboard, a ticketing machine, a ticket barrier, a metro rail, a metro station device, a passenger information panel, an onboard camera, and other connected device on a public transport vehicle.

As further way of example, the communication IoT device may be a wearable device, or a device related to extended reality, wherein the device related to extended reality may be a device related to augmented reality, virtual reality, merged reality, or mixed reality. Examples of such IoT devices may be a smart-band, a tracker, a haptic glove, a haptic suit, a smartwatch, clothes, eyeglasses, a head mounted display, an ear pod, an activity monitor, a fitness monitor, a heart rate monitor, a ring, a key tracker, a blood glucose meter, and a pressure meter.

As further ways of example, the IoT device may be an industrial application device wherein an industrial application device may be an industrial unmanned aerial vehicle, an intelligent industrial robot, a vehicle assembly robot, and an automated guided vehicle.

As further ways of example, the IoT device may be a transportation vehicle, wherein a transportation vehicle may be a bicycle, a motor bike, a scooter, a moped, an auto rickshaw, a rail transport, a train, a tram, a bus, a car, a truck, an airplane, a boat, a ship, a ski board, a snowboard, a snow mobile, a hoverboard, a skateboard, roller-skates, a vehicle for freight transportation, a drone, a robot, a stratospheric aircraft, an aircraft, a helicopter and a hovercraft.

Figure 3:
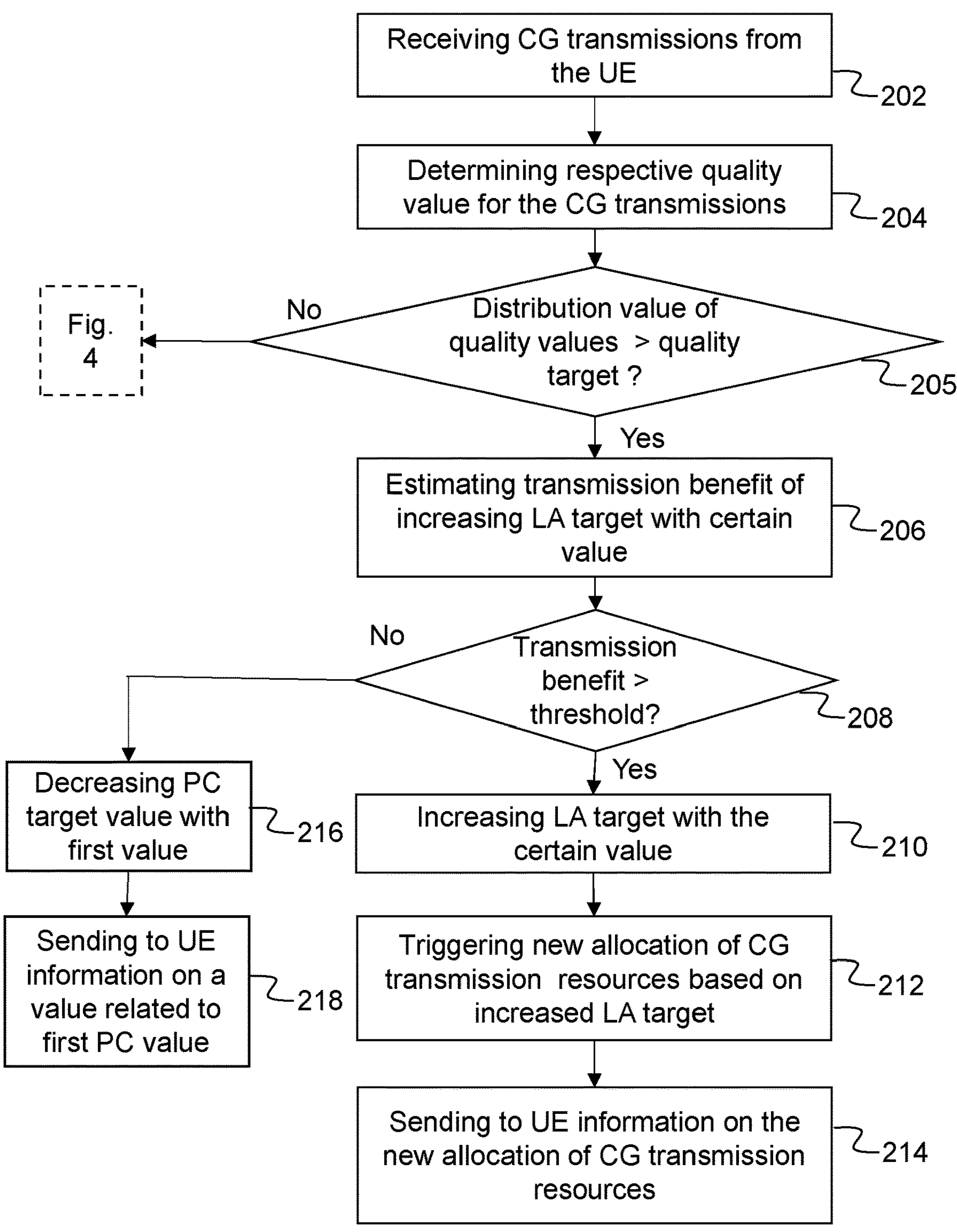
FIG. 3 is a flow chart illustrating a method performed by a network node, according to possible embodiments.

As further ways of example, the IoT device may be a health or fitness device, wherein a health or fitness device may be a surgical robot, an implantable medical device, a non-invasive medical device, and a stationary medical device which may be an in-vitro diagnostic device, a radiology device, a diagnostic imaging device, and an x-ray device FIG. 3, in conjunction with FIG. 2, shows a method performed by a network node 130 of a wireless communication network 100 for controlling transmission parameters of UL CG transmissions sent by a UE 140 and received by the network node 130. The method comprises receiving 202, from the UE 140, CG transmissions over time on first allocated CG transmission resources, the CG transmissions transmitted by the UE 140 with a power that is related to a power control, PC, target value and a link adaptation, LA, target value. The method further comprises determining 204 a respective transmission quality value for the CG transmissions received over time. When a distribution value of the determined transmission quality values received over time is higher 205 than a transmission quality target value, the method further comprises estimating 206 a transmission benefit of increasing the LA target value with a certain value and determining 208 whether the estimated transmission benefit is higher than a transmission benefit threshold. When the estimated transmission benefit is higher than the transmission benefit threshold, the LA target value is increased 210 with the certain value, a new allocation of CG transmission resources is triggered 212 based on the increased LA target value, and information on the new allocation of CG transmission resources are sent 214 to the UE 140. When the estimated transmission benefit is lower than the transmission benefit threshold, the PC target value is decreased 216 with a first PC value while maintaining the LA target value, and information on a value related to the first PC value are sent 218 to the UE 140.

The PC target value and the LA target value are determined by the network node. Information related to the PC target value and the LA target value are sent to the UE for determining its transmission power. The information related to the PC target value and the LA target value may be for example the actual PC target value and the LA target value. Alternatively, it may be a P0 value, which is a power spectrum density target per PRB determined from the PC target value and the LA target value. The LA target value is designed to enable fulfilment of transmission quality requirements with the CG transmission resource allocation. The LA target value is a type of transmission quality target, such as SINR target. The transmission quality value is a value of the quality of the communication channel between the UE and the network node, such as Block Error Rate (BLER) or Signal to Interference and Noise Ratio (SINR). The transmission quality values are determined by e.g., measurements on signals sent by the UE and received by the network node. The distribution value of the transmission quality values may be a percentile value of at least 50%, for example the 90th percentile, i. e. when 90% of the transmission quality values are above the transmission quality target value, the distribution value is considered to be above the target value. A higher transmission quality value than the target value means that the quality is better than the target value. For example, a higher SINR than the SINR target value, or a lower BLER than the BLER target value. The "certain value" could be related to the difference between the distribution value and the transmission quality target value. Alternatively, the "certain value" could be a fixed value. The "transmission benefit" is an estimation of how much the network node, the wireless communication network and/or the CG transmissions would benefit of increasing the LA target value with the certain value, in terms of e.g., increased transmission throughput, spared transmission resources etc. The transmission benefit and the "transmission benefit threshold" could be an increase with a certain number of MCSs from the MCS used for the CG transmissions received on the first transmission resources (the MCSs are numbered 0, 1, 2,) or a decrease in a certain number of PRBs used for the CG transmissions compared to the number of first allocated transmission resources that were used for the reception of the CG transmissions received on the first transmission resources. In other words, if the estimated transmission benefit, i.e., a decrease in number of PRBs or increase of MCS i.e., using less robust MCS, is higher than the benefit threshold, the LA target value is increased with the certain value. The information on a value related to the first PC value that is sent 218 to the UE 140 may be the first PC value, that is the value with which the PC target value is to be decreased or it may be any other value that is determined from the value with which the PC target is to be decreased.

Figure 5A:
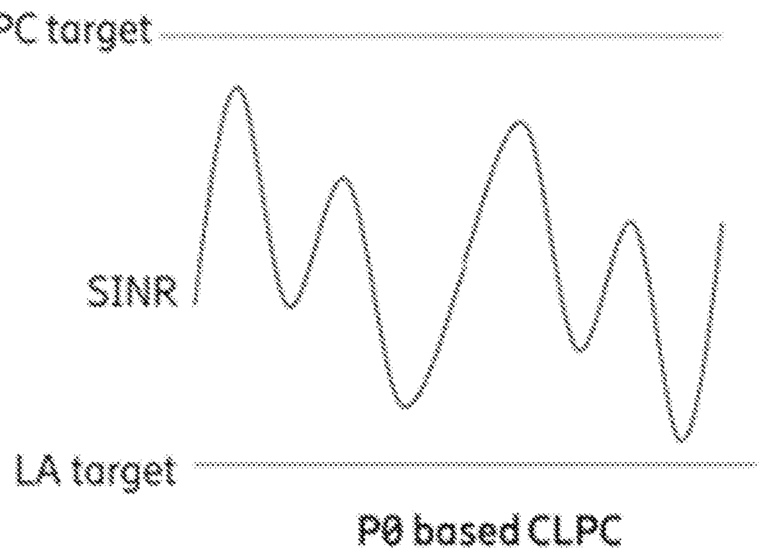
FIG. 5*a* is a diagram of SINR of a P0-based CLPC according to the prior art.
Figure 5B:
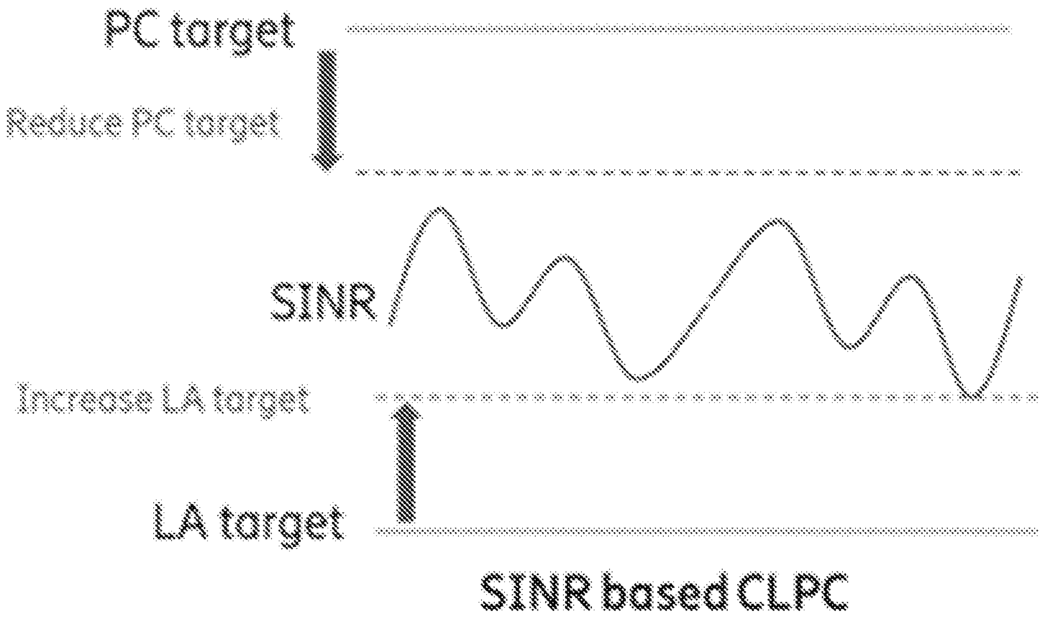
FIG. 5*b* is a diagram of SINR of a SINR-based CLPC such as the one shown in pending patent application PCT/SE2021/050478, in which embodiments of the present invention is used.

With the above-described method, when the distribution value of the transmission quality values over time is determined to be above its target value, and the benefit of increasing the LA target value is determined to be high enough, the LA target value can be increased so that a higher MCS is selected which results in a gain of transmission resource efficiency. On the other hand, when the distribution value of the transmission quality values over time is determined to be above its target value, but the benefit of increasing the LA target value is not determined to be high enough, the PC target value may instead by reduced, which results in a reduced UE transmit power so that UE battery lifetime is prolonged and intercell interference occurring to the signals sent by the UE is reduced. This is also illustrated in FIGS. 5*a* and 5*b*, which will be discussed below. More generally, the above-described method, as well as its embodiments, improves known Configured Grant procedures. Therefore, it can improve communication for UEs working in Configured Grant, such as URLLC classified UEs.

Figure 4:
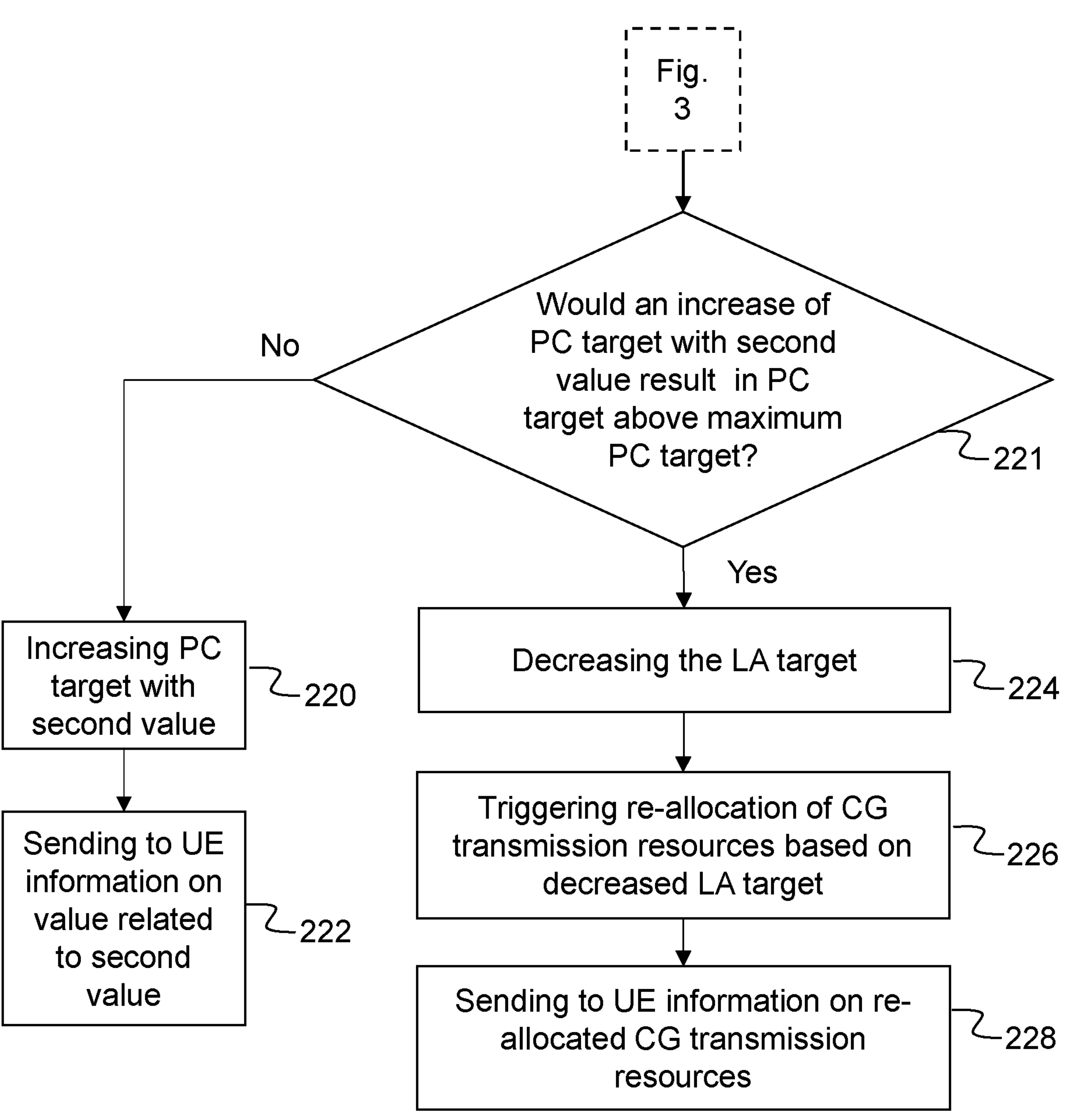
FIG. 4 is a flow chart illustrating alternative embodiments of a method performed by a network node.

According to an embodiment, which is shown in FIG. 4, following a "No" to box 205 of FIG. 3, the method further comprises, when the distribution value of the determined transmission quality values received over time is lower than the transmission quality target value, increasing 220 the PC target value with a second PC value while maintaining the LA target value, as long as the increased PC target value is below 221 a maximum PC target value, and sending 222 to the UE 140, information on a value related to the second PC value.

According to another embodiment, which is also shown in FIG. 4, following a "No" to box 205 of FIG. 3, the method further comprises, when the distribution value of the determined transmission quality values received over time is lower than the transmission quality target value and an increase of the PC target value with the second PC value would result in an increased PC target value being above 221 a maximum PC target value, decreasing 224 the LA target value, triggering 226 a re-allocation of CG transmission resources based on the decreased LA target value, and sending 228 to the UE 140 information on the re-allocated CG transmission resources.

According to yet another embodiment, the LA target value is a LA transmission quality target value, and the certain value with which the LA transmission quality target value is increased 210 is equal to a difference between the distribution value of the determined transmission quality values received over time and the transmission quality target value. The LA transmission quality target value may be a LA SINR target value, and the distribution value of the determined transmission quality values is a distribution value of the SINR values such as a target percentile value of the SINR values.

According to an alternative, the certain value with which the LA target value is increased 210 is a fixed value.

According to another embodiment, the first PC value with which the PC target value is decreased 216 is a fixed value or a value that is dependent on a difference between the distribution value of the determined transmission quality values and the PC target value.

According to another embodiment, the second PC value with which the PC target value is increased 220 is a fixed value or a value that is dependent on a difference between the distribution value of the determined transmission quality values and the PC target value.

FIGS. 5*a* and 5*b* illustrate advantages of embodiment of the present invention. FIG. 5*a* describes P0-based fast closed loop power control according to prior art. Since power control does not try to compensate for interference components, the SINR has a large variation. FIG. 5*b*, using SINR based power control as for example in the pending International patent application PCT/SE2021/050478, the SINR distribution is reduced. With embodiments of the outer loop adjustment proposed in this disclosure, the SINR backoff can be reduced, corresponding to increase of SINR link adaptation target, so a higher MCS can be selected, and spectrum efficiency gain can be achieved. Another alternative is to reduce PC target, so that UE transmit power can be more efficient and intercell interference can be reduced, both alternatives being shown in FIG. 5*b*, with thick arrows.

Figure 6:
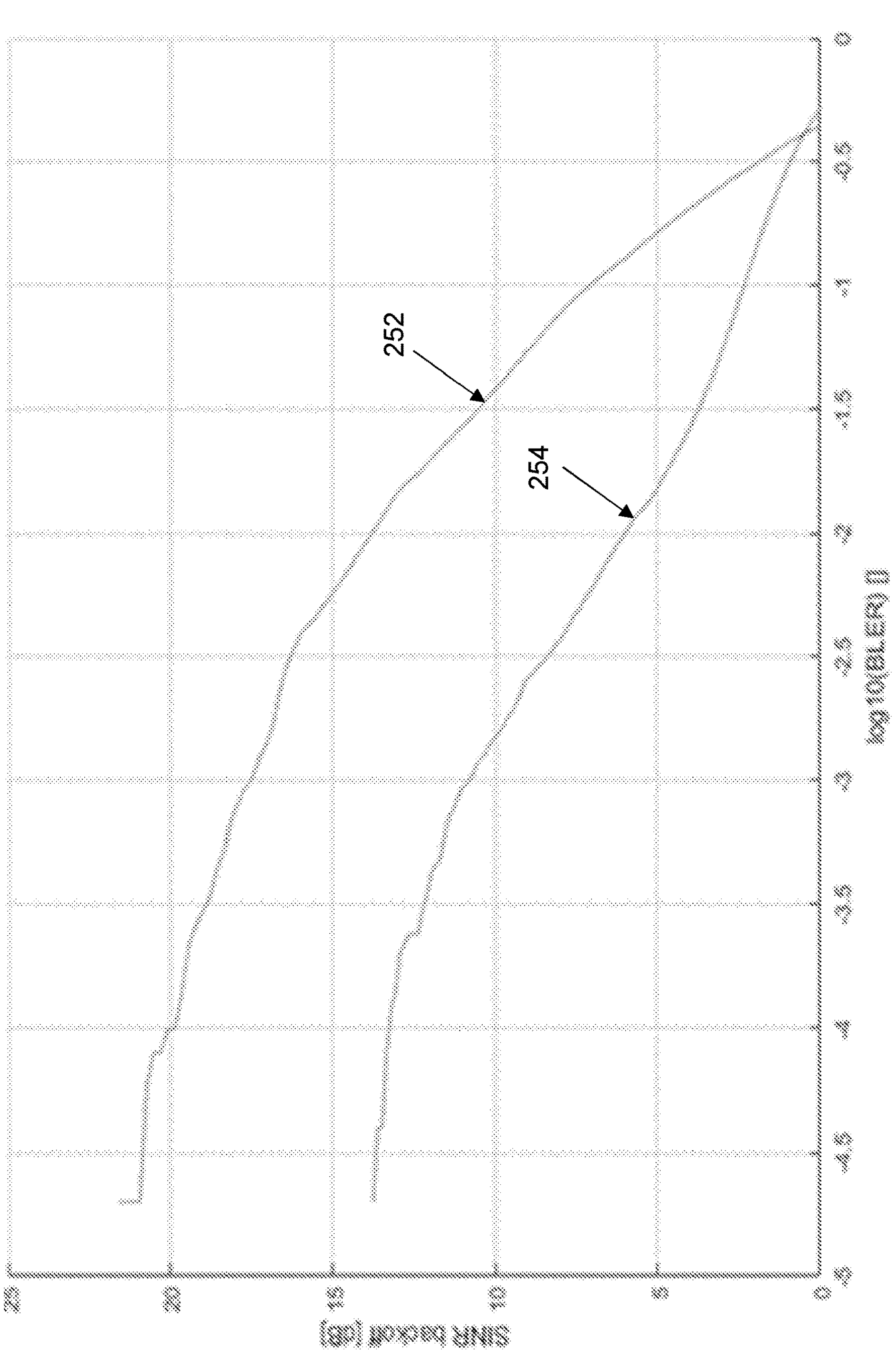
FIG. 6 is a diagram showing BLER on x-axis and SINR backoff on y-axis showing simulation results when using power control according to embodiments compared to not using power control according to the embodiments.

In simulation results that are shown in FIG. 6, it is shown that with fast SINR based closed loop power control, much lower SINR backoff will also meet the required BLER target. With embodiments of the present invention, the SINR backoff can be adjusted so that e.g., higher MCS can be selected. In many cases, the gain can be even higher than 8 dB. Curve 252 shows SINR backoff without power control according to embodiment, and curve 254 shows SINR backoff with power control according to embodiments. In the simulation, SINR reference was 10 dB and noise rise 5 dB.

Figure 7:
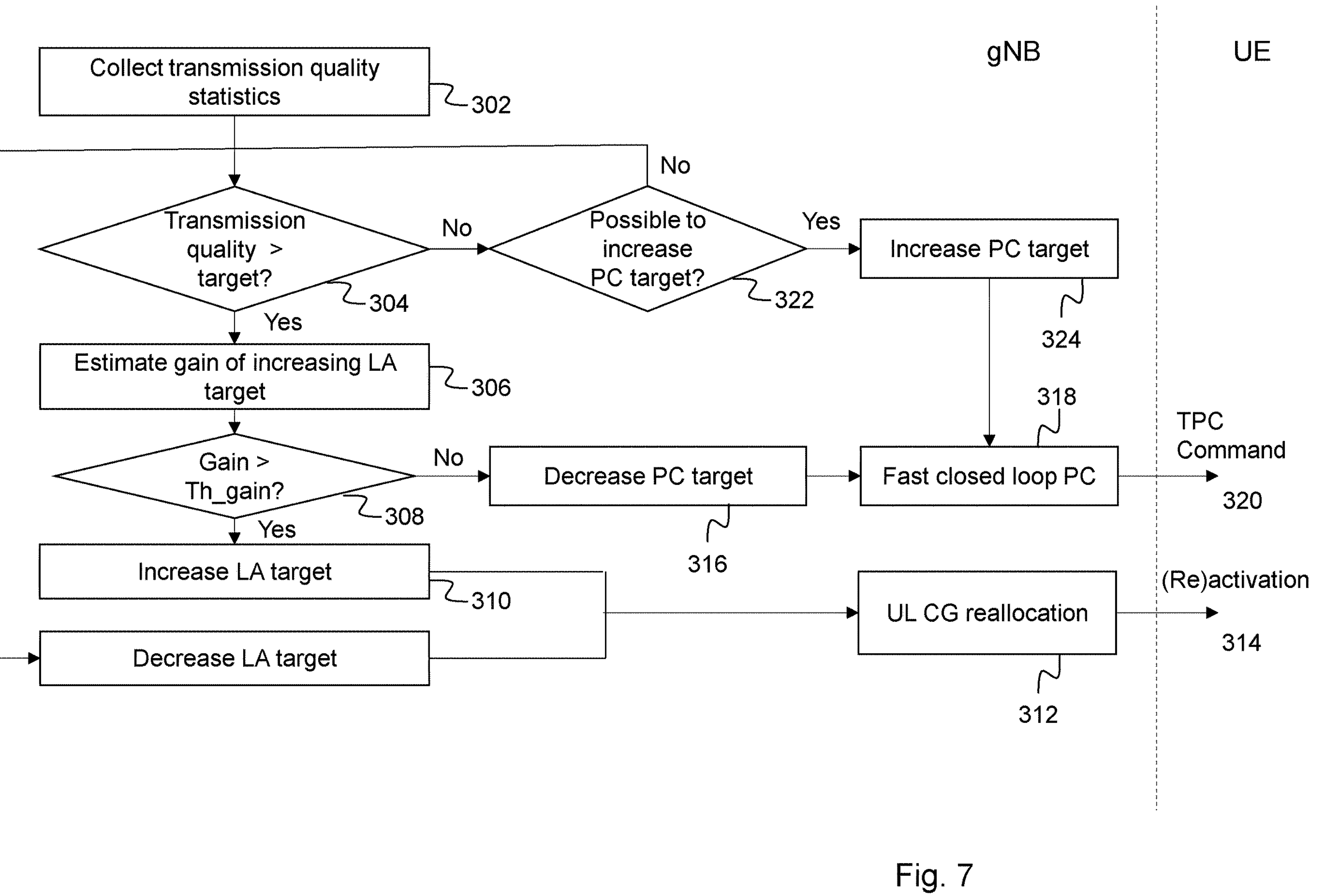
FIG. 7 is a flow chart illustrating alternative embodiments of a method performed by a network node.

In FIG. 7, a flow chart of a method of an embodiment of the present invention is shown. An objective of the outerloop power control function is to determine new PC_target and new LA_target. A benefit of introducing outerloop control is to adjust the PC_target and the LA_target to adapt to channel quality variation, aka transmission quality variation slowly, such as on a time scale of tens or hundreds of milliseconds, as opposed to power control which may occur on a time-slot time scale. A more efficient UE transmit power and/or MCS can be obtained by reducing PC_target and/or increasing LA_target if the channel quality variation is much smaller than the initial channel quality variation before introducing fast closed loop power control.

To obtain a new LA_target, a link adaptation adjustment threshold, TH_LA_target, which is a kind of transmission benefit threshold, is defined. An increase of LA_target so that a transmission benefit value is larger than TH_LA_target indicates the spectrum efficiency gain is significant enough to change UL CG allocation. For example, the scheduler decides that it will only change UL CG allocation if more than X PRBs with the new allocation will be saved. Here, in this case TH_LA_target as well as the transmission benefit is defined as the number of saved PRB. To obtain more efficient UL CG allocation, higher MCS and SINR is required. TH_LA_target can also be defined as a threshold representing SINR increase which will result in a PRB allocation with X PRB fewer. It is possible to have pre-computed SINR threshold table that is corresponding to different SINR thresholds for different spectrum efficiency enhancement requirements of UL CG resource allocation adjustment.

The method of FIG. 7 starts by collecting 302 transmission quality fulfillment statistics, which can be based on e.g., the decoding results, such as BLER or SINR statistics. At step 304 it is determined whether a distribution value, i.e., a target percentile of the transmission quality fulfilment statistics is better than a transmission quality target, e.g., if BLER distribution value is lower than a BLER target or if SINR distribution value is higher than SINR target. If the collected or determined transmission quality statistics is better than the transmission quality target, a transmission benefit, aka gain, of increasing the LA target value with a LA target step size_increase is estimated 306. The LA target step size_increase may be equal to the difference between the target percentile of the transmission quality and the previous LA target. Alternatively, the LA target step size_increase could be a fixed value in dB. The gain of increasing the LA target value can be determined in, e.g., number of PRBs that can be saved when the LA target is increased. The estimated gain is then compared 308 to a gain threshold (TH_gain). In case the estimated gain is above TH_gain, e.g., estimated gain is 3 PRB and TH_gain is 2 PRB, LA target is increased 310 with the LA target step size_increase and a re-allocation of CG transmission resources is performed 312 based on the increased LA target. Further, an activation message is sent 314 wirelessly to the UE to inform the UE of the re-allocated CG transmission resources. The activation message may be sent as a Downlink Control Information (DCI) 0_0/0_1 as defined in e.g., 3GPP TS 38.212, V 16.7.0, Section 7.3.

In case the estimated gain 306 is below TH_gain, e.g., estimated gain is 1 PRB and TH_gain is 2 PRB, the LA target is maintained on the same value, i.e. no increase with any LA target step size is performed. Instead, the PC target value is decreased 316 with a PC target step size_decrease. The PC target step size_decrease may be equal to the difference between the target percentile of the transmission quality and the previous PC target. Alternatively, the PC target step size_decrease may be a fixed value in dB. The decreased PC target is then used 318 in a fast closed loop PC method such as the one described in the co-pending International patent application, where transmit power control (TPC) commands are generated based on the PC target and sent 320 wirelessly towards the UE.

Further, if the collected or determined transmission quality statistics is worse 304 than the transmission quality target, it is determined 322 whether it is possible to increase the PC target any further, i.e., if a maximum allowed PC target is reached or nor. If the PC target is allowed to be increased, it is increased 324 with a PC target step size_increase. The PC target step size_increase may be equal to the difference between the target percentile of the transmission quality and the previous PC target. Alternatively, the PC target step size_increase may be a fixed value in dB. The PC target step size_decrease and the PC target step size_increase may be the same absolute value. The PC target step size_decrease and/or the PC target step size_increase may be the same step size as a step size used in TPC commands. The increased PC target is then used 318 in a fast closed loop PC method such as the one described in the pending International patent application PCT/SE2021/050478, where TPC commands are generated based on the PC target and sent 320 wirelessly towards the UE. If it is determined 322 that it is not possible increase the PC target any further, the LA target is decreased 326 with a LA target step size_descrease and a re-allocation of CG transmission resources is performed 312 based on the decreased LA target. The LA target step size_decrease may be equal to the difference between the target percentile of the transmission quality and the previous LA target. Alternatively, the LA target step size_decrease may be a fixed value in dB. Further, an activation message is sent 314 wirelessly to the UE to inform the UE of the re-allocated CG transmission resources.

Figure 8:
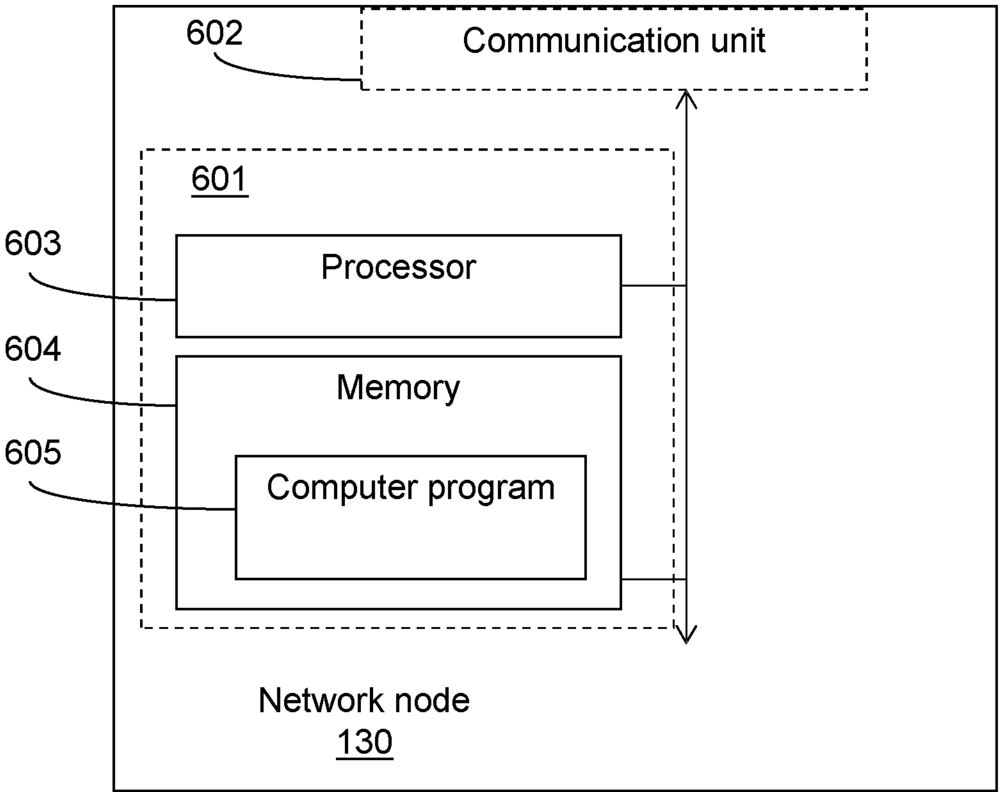
FIG. 8 is a block diagram illustrating a network node in more detail, according to further possible embodiments.

FIG. 8, in conjunction with FIG. 2, shows a network node 130 configured to operate in a wireless communication network 100 and configured for controlling transmission parameters of UL CG transmissions sent by a UE 140. The network node 130 comprises a processing circuitry 603 and a memory 604. Said memory contains instructions executable by said processing circuitry, whereby the network node 130 is operative for receiving, from the UE 140, CG transmissions over time on first allocated CG transmission resources, the CG transmissions transmitted by the UE 140 with a power that is related to a power control, PC, target value and a link adaptation, LA, target value and determining a respective transmission quality value for the CG transmissions received over time. Further, when a distribution value of the determined transmission quality values received over time is higher than a transmission quality target value, the network node 130 is operative for estimating a transmission benefit of increasing the LA target value with a certain value and determining whether the estimated transmission benefit is higher than a transmission benefit threshold. Further, when the estimated transmission benefit is higher than the transmission benefit threshold, the network node 130 is operative for increasing the LA target value with the certain value, triggering a new allocation of CG transmission resources based on the increased LA target value and sending to the UE 140, information on the new allocation of CG transmission resources, or when the estimated transmission benefit is lower than the transmission benefit threshold, the network node 130 is operative for decreasing the PC target value with a first PC value while maintaining the LA target value, and sending to the UE 140, information on a value related to the first PC value.

According to an embodiment, the network is operative for increasing the PC target value with a second PC value while maintaining the LA target value, when the distribution value of the determined transmission quality values received over time is lower than the transmission quality target value and as long as the increased PC target value is below a maximum PC target value, and sending to the UE 140, information on a value related to the second PC value.

According to another embodiment, the second PC value with which the PC target value is increased is a fixed value or a value that is dependent on a difference between the distribution value of the determined transmission quality values and the PC target value.

According to another embodiment, the network node is further operative for, when the distribution value of the determined transmission quality values received over time is lower than the transmission quality target value and an increase of the PC target value with the second PC value would result in an increased PC target value being above a maximum PC target value, decreasing the LA target value, triggering a re-allocation of CG transmission resources based on the decreased LA target value, and sending to the UE 140 information on the re-allocated CG transmission resources.

According to another embodiment, the LA target value is a LA transmission quality target value, and the certain value with which the LA transmission quality target value is increased is equal to a difference between the distribution value of the determined transmission quality values received over time and the transmission quality target value.

According to another embodiment, the certain value with which the LA target value is increased is a fixed value.

According to yet another embodiment, the first PC value with which the PC target value is decreased is a fixed value or a value that is dependent on a difference between the distribution value of the determined transmission quality values and the PC target value.

According to other embodiments, the network node 130 may further comprise a communication unit 602, which may be considered to comprise conventional means for wireless communication with the wireless device 140, such as a transceiver for wireless transmission and reception of signals in the communication network. The communication unit 602 may also comprise conventional means for communication with other network nodes of the wireless communication network 100. The instructions executable by said processing circuitry 603 may be arranged as a computer program 605 stored e.g. in said memory 604. The processing circuitry 603 and the memory 604 may be arranged in a sub-arrangement 601. The sub-arrangement 601 may be a micro-processor and adequate software and storage therefore, a Programmable Logic Device, PLD, or other electronic component(s)/processing circuit(s) configured to perform the methods mentioned above. The processing circuitry 603 may comprise one or more programmable processor, application-specific integrated circuits, field programmable gate arrays or combinations of these adapted to execute instructions.

The computer program 605 may be arranged such that when its instructions are run in the processing circuitry, they cause the network node 130 to perform the steps described in any of the described embodiments of the network node 130 and its method. The computer program 605 may be carried by a computer program product connectable to the processing circuitry 603. The computer program product may be the memory 604, or at least arranged in the memory. The memory 604 may be realized as for example a RAM (Random-access memory), ROM (Read-Only Memory) or an EEPROM (Electrical Erasable Programmable ROM). In some embodiments, a carrier may contain the computer program 605. The carrier may be one of an electronic signal, an optical signal, an electromagnetic signal, a magnetic signal, an electric signal, a radio signal, a microwave signal, or computer readable storage medium. The computer-readable storage medium may be e.g. a CD, DVD or flash memory, from which the program could be downloaded into the memory 604. Alternatively, the computer program may be stored on a server or any other entity to which the network node 130 has access via the communication unit 602. The computer program 605 may then be downloaded from the server into the memory 604.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for an apparatus or method to address each and every problem sought to be solved by the presently described concept, for it to be encompassed hereby. In the exemplary figures, a broken line generally signifies that the feature within the broken line is optional.

The invention claimed is:

1. A method performed by a network node of a wireless communication network for controlling transmission parameters of uplink (UL) configured grant (CG) transmissions sent by a user equipment (UE) and received by the network node, the method comprising:

receiving, from the UE, CG transmissions over time on first allocated CG transmission resources, the CG transmissions transmitted by the UE with a power that is related to a power control (PC) target value and a link adaptation (LA) target value;

determining a respective transmission quality value for the CG transmissions received over time;

as a result of determining that a distribution value of the determined transmission quality values received over time is higher than a transmission quality target value, estimating a transmission benefit of increasing the LA target value with a certain value, and determining whether the estimated transmission benefit is higher than a transmission benefit threshold; and i) as a result of determining that the estimated transmission benefit is higher than the transmission benefit threshold, increasing the LA target value with the certain value, triggering a new allocation of CG transmission resources based on the increased LA target value, and sending to the UE, information on the new allocation of CG transmission resources, or ii) as a result of determining that the estimated transmission benefit is lower than the transmission benefit threshold, decreasing the PC target value with a first PC value while maintaining the LA target value, and sending to the UE, information on a value related to the first PC value.

2. The method of claim 1, further comprising:

as a result of determining that the distribution value of the determined transmission quality values received over time is lower than the transmission quality target value, increasing the PC target value with a second PC value while maintaining the LA target value, as long as the increased PC target value is below a maximum PC target value, and sending to the UE, information on a value related to the second PC value.

3. The method of claim 2, wherein the second PC value with which the PC target value is increased is a fixed value or a value that is dependent on a difference between the distribution value of the determined transmission quality values and the PC target value.

4. The method of claim 1, further comprising:

as a result of determining that the distribution value of the determined transmission quality values received over time is lower than the transmission quality target value and an increase of the PC target value with the second PC value would result in an increased PC target value being above a maximum PC target value, decreasing the LA target value, triggering a re-allocation of CG transmission resources based on the decreased LA target value, and sending to the UE information on the re-allocated CG transmission resources.

5. The method of claim 1, wherein the LA target value is a LA transmission quality target value, and the certain value with which the LA transmission quality target value is increased is equal to a difference between the distribution value of the determined transmission quality values received over time and the transmission quality target value.

6. The method of claim 1, wherein the certain value with which the LA target value is increased is a fixed value.

7. The method of claim 1, wherein the first PC value with which the PC target value is decreased is a fixed value or a value that is dependent on a difference between the distribution value of the determined transmission quality values and the PC target value.

8. A network node configured to operate in a wireless communication network and configured for controlling transmission parameters of UL CG transmissions sent by a UE, the network node comprising a processing circuitry and a memory, the memory containing instructions executable by the processing circuitry, wherein the network node is operative for:

receiving, from the UE, CG transmissions over time on first allocated CG transmission resources, the CG transmissions transmitted by the UE with a power that is related to a power control (PC) target value and a link adaptation (LA) target value;

determining a respective transmission quality value for the CG transmissions received over time;

as a result of determining that a distribution value of the determined transmission quality values received over time is higher than a transmission quality target value, estimating a transmission benefit of increasing the LA target value with a certain value, and determining whether the estimated transmission benefit is higher than a transmission benefit threshold; and i) as a result of determining that the estimated transmission benefit is higher than the transmission benefit threshold, increasing the LA target value with the certain value, triggering a new allocation of CG transmission resources based on the increased LA target value, and sending to the UE, information on the new allocation of CG transmission resources, or ii) as a result of determining that the estimated transmission benefit is lower than the transmission benefit threshold, decreasing the PC target value with a first PC value while maintaining the LA target value, and sending to the UE, information on a value related to the first PC value.

9. The network node of claim 8, further being operative for:

as a result of determining that the distribution value of the determined transmission quality values received over time is lower than the transmission quality target value, increasing the PC target value with a second PC value while maintaining the LA target value, as long as the increased PC target value is below a maximum PC target value, and sending to the UE, information on a value related to the second PC value.

10. The network node of claim 9, wherein the second PC value with which the PC target value is increased is a fixed value or a value that is dependent on a difference between the distribution value of the determined transmission quality values and the PC target value.

11. The network node of claim 8, further being operative for:

as a result of determining that the distribution value of the determined transmission quality values received over time is lower than the transmission quality target value and an increase of the PC target value with the second PC value would result in an increased PC target value being above a maximum PC target value, decreasing the LA target value, triggering a re-allocation of CG transmission resources based on the decreased LA target value, and sending to the UE information on the re-allocated CG transmission resources.

12. The network node of claim 8, wherein the LA target value is a LA transmission quality target value, and the certain value with which the LA transmission quality target value is increased is equal to a difference between the distribution value of the determined transmission quality values received over time and the transmission quality target value.

13. The network node of claim 8, wherein the certain value with which the LA target value is increased is a fixed value.

14. The network node of claim 8, wherein the first PC value with which the PC target value is decreased is a fixed value or a value that is dependent on a difference between the distribution value of the determined transmission quality values and the PC target value.

15. A non-transitory computer readable storage medium storing a computer program comprising instructions, which, when executed by at least one processing circuitry of a network node of a wireless communication network, the network node being configured for controlling transmission parameters of UL CG transmissions sent by a UE, causes the network node to perform the following steps:

receiving, from the UE, CG transmissions over time on first allocated CG transmission resources, the CG transmissions transmitted by the UE with a power that is related to a power control (PC) target value and a link adaptation (LA) target value;

determining a respective transmission quality value for the CG transmissions received over time;

as a result of determining that a distribution value of the determined transmission quality values received over time is higher than a transmission quality target value, estimating a transmission benefit of increasing the LA target value with a certain value, and determining whether the estimated transmission benefit is higher than a transmission benefit threshold; and i) as a result of determining that the estimated transmission benefit is higher than the transmission benefit threshold, increasing the LA target value with the certain value, triggering a new allocation of CG transmission resources based on the increased LA target value, and sending to the UE, information on the new allocation of CG transmission resources, or ii) as a result of determining that the estimated transmission benefit is lower than the transmission benefit threshold, decreasing the PC target value with a first PC value while maintaining the LA target value, and sending to the UE, information on a value related to the first PC value.

* * * * *